May 20, 1930.    W. JACOBS    1,759,558
VARIABLE SPEED GEAR
Filed March 26, 1929
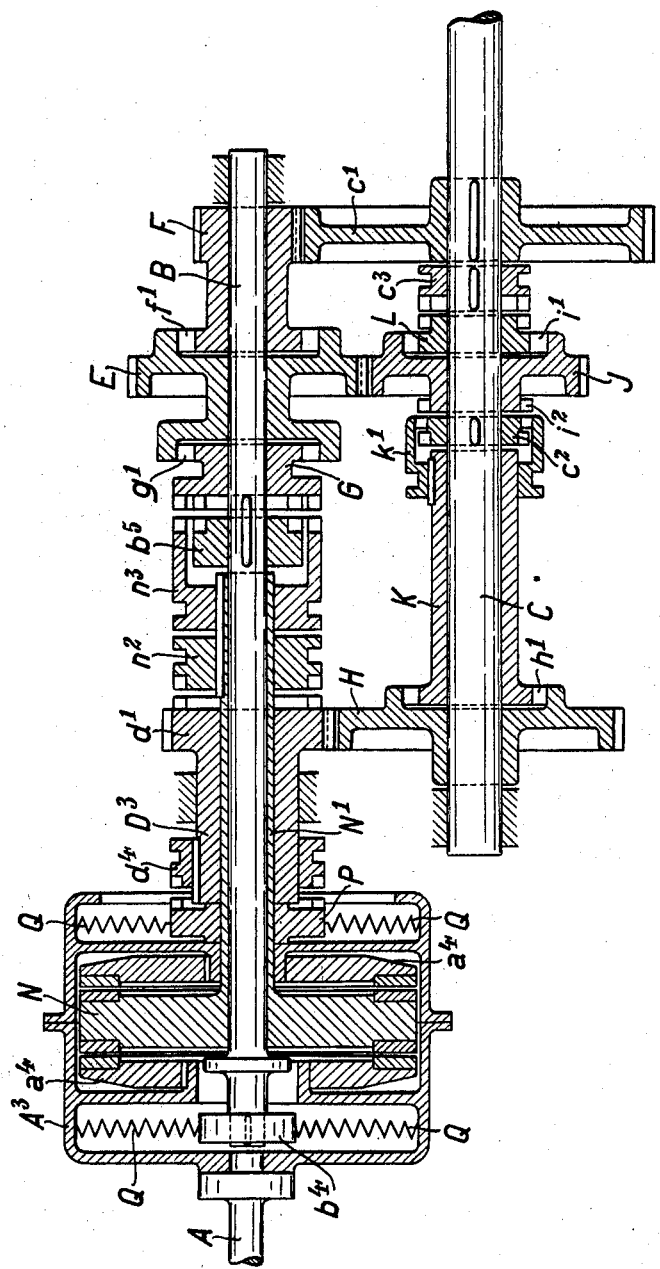
Inventor
Werner Jacobs
by Knight Bros.,
Attorneys.

Patented May 20, 1930

1,759,558

UNITED STATES PATENT OFFICE

WERNER JACOBS, OF ESSEN, GERMANY, ASSIGNOR TO FRIED. KRUPP AKTIENGESELL-SCHAFT, OF ESSEN-ON-THE-RUHR, GERMANY

VARIABLE-SPEED GEAR

Application filed March 26, 1929, Serial No. 350,059, and in Germany April 4, 1928.

The invention relates to variable speed gear and particularly to gears permitting passage from one speed to another without interruption of the transmission of power, of the type described and claimed in my Letters Patent No. 1,724,202 of August 13, 1929, and also in my co-pending patent application Ser. No. 283,367, filed June 6, 1928, which matured into Patent Number 1,741,631. The invention consists in arranging two couplings adapted to be operated at will between a main coupling and the power transmitting spur wheels, by which couplings the driving shaft can be positively connected to the driven shaft through each a gear wheel train provided for a certain speed step, independently of the coupling action of the two halves of the main coupling. This modification is particularly well suited to be employed with a variable speed gear in which resiliently turning coupling members are arranged between the main coupling and the spur wheels, for reducing the frequency of the inherent vibration of the gear. If the two couplings adapted to be operated at will were arranged before the main coupling, they would be exposed to all variations of the periodically varying turning moment of the driving engine, so that a rapid wear would arise on the engaging faces and a smooth operation would be impossible. This drawback can be obviated according to the invention by arranging the two couplings adapted to be operated at will behind the main coupling.

In order that the invention can be more easily understood, a preferred embodiment of it is illustrated in longitudinal section in the accompanying drawing, the variable speed gear shown being particularly intended for Diesel engines.

Referring to this drawing, A denotes the driving shaft, C the driven shaft, and B an intermediate shaft. Individual spur wheels, $c^1$, H, J, are mounted on shaft C in combination with free wheel couplings $h^1$, $i^1$ and with positively operated couplings K, $k^1$, $c^2$, $i^2$ and $c^3$ L. Wheels F and E are mounted on the intermediate shaft B in combination with free wheel couplings G, $g^1$, $f^1$, these wheels being in mesh with the wheels $c^1$ and J. The spur wheel $d^1$, in mesh with spur wheel H, is mounted on a hollow shaft $D^3$ which freely revolves on a hollow shaft $N^1$ rigidly connected to the one half, N, of the main coupling and freely rotatable on shaft B. The other half, $A^3$, of the main coupling is in permanent rigid connection with the driving shaft and carries friction disks $a^4$ on both sides of the coupling half N, which disks can be shifted axially, to establish coupling connection. Coaxially with shaft B coupling members $b^4$ and P are arranged on both sides of the friction disks $a^4$, which members are connected to the coupling half $A^3$ by springs Q and are capable of slipping relatively to half $A^3$ against the action of these springs. The coupling member $b^4$ is rigidly connected to shaft B, and member P is arranged for free rotation on the hollow shaft $N^1$. Member P further forms at the same time one half of a claw coupling, adapted to operate at will, the appurtenant other coupling half, denoted by $d^4$, being shiftably fixed on the hollow shaft $D^3$. There is also another positively operated coupling consisting of a half $b^5$ shiftably fixed on shaft B and of the half G of the free wheel coupling G, $g^1$ which half has corresponding coupling claws and is inserted in front of spur wheel E. Spur wheel $d^1$ can be coupled with the hollow shaft $N^1$ by a claw coupling having a coupling half $n^2$ shiftably fixed on shaft $N^1$. Beside half $n^2$ there is shiftably mounted on $N^1$, still another coupling half, $n^3$, by which the coupling half G can be coupled with half N of the main coupling through the intermediary of the hollow shaft $N^1$.

In describing the operation of the variable speed gear I shall start from a position of the parts as illustrated in the drawing, in which all claw couplings and the main coupling are out of operation, so that upon the engine being started, first only the parts A $A^3$, $a^4$, P, $b^4$ B $b^5$ revolve.

For running with the wheel train F $c^1$, which corresponds to the first speed step, the coupling halves $n^3$, G are engaged. Now when the main coupling N, $a^4$ $A^3$ is thrown in, shaft C is driven from shaft A through the parts $A^3$ $a^4$, N $N^1$ $n^3$, G, $g^1$, E, $f^1$, F, $c^1$. As soon as the coupling halves N and $A^3$ $a^4$ have reached equal rates of revolution, the coupling $b^5$, G is thrown in and the coupling $n^3$ G and the main coupling N, $a^4$ $A^3$ thrown out, so that power transmission now takes place through $A^3$, Q, $b^4$, B, $b^5$, G, $g^1$, E, $f^1$, F $c^1$. The coupling half N the connection of which with the driven parts is interrupted at $n^3$, then comes to rest, if not entrained by bearing friction; spur wheel J revolves without load relatively to shaft C.

To pass to the next higher, speed step corresponding to wheel train $d^1$ H, coupling $k^1$, $c^2$ is thrown in, so that coupling half K now revolves at the same speed as shaft C. Coupling $n^2$, $d^1$ is likewise thrown in, so that spur wheel H is brought to connection with coupling half N (still at rest) through $d^1$, $n^2$, $N^1$. Now upon throwing in again the main coupling N, $a^4$ $A^3$, spur wheel H is accelerated first, through $A^3$, $a^4$, N $N^1$ $n^2$, $d^1$, to the speed of the coupling half K that revolves at the rate of shaft C. With further acceleration the free wheel coupling $h^1$ is automatically thrown in. The turning moment of driving shaft A is now transmitted to shaft C through the members $A^3$ $a^4$, N $N^1$ $n^2$, $d^1$, H, $h^1$, K, $k^1$, $c^2$, whilst the power transmission that existed in the first speed step is interrupted by free wheel coupling $f^1$ being released automatically. Shaft C thus has passed from the first to the second speed step without interruption of the power transmission. Spur wheel E which is connected to shaft B through claw coupling $b^5$, G and free wheel coupling $g^1$, takes part in the rotation without load, the same being the case with spur wheel J loose on shaft C. As soon as the coupling halves N and $A^3$ $a^4$ have reached equal rates of revolution, coupling P, $d^4$ is thrown in. Thereupon coupling $b^5$, G and main coupling N, $a^4$ $A^3$ are thrown out, so that power transmission now takes place through $A^3$, Q, P, $d^4$, $D^3$ $d^1$, H, $h^1$, $k^1$, $c^2$, C.

To run at the highest, third speed step by means of wheel train E, J, the couplings $c^3$, L and $n^3$, G are thrown in. Upon throwing in again the main coupling N, $a^4$ $A^3$, spur wheel J is first accelerated up to the speed of the coupling half L which revolves at the rate of shaft C, through the intermediary of the members N, $N^1$, $n^3$, G, $g^1$, E. With further acceleration the free wheel coupling $i^1$ automatically starts to transmit. The turning moment of the driving shaft A is now transmitted to the driven shaft C through the members $A^3$ $a^4$, N $N^1$ $n^3$, G, $g^1$, E, J, $i^1$, L, and $c^3$, whilst the power transmission which was operative in the second speed step is interrupted by the free wheel coupling $h^1$ automatically being disengaged. Shaft C thus has passed from the second to the third speed step without interruption of the power transmission. As soon as the coupling halves N and $A^3$ $a^4$ have reached equal rates of revolution, coupling $b^5$, G is thrown in. The coupling P, $d^4$ and the main coupling N, $a^4$ $A^3$ are then thrown out again, so that the power transmission now takes place through $A^3$, Q $b^4$ B $b^5$, G, $g^1$, E, J, $i^1$, L, $c^3$.

The passage from a higher speed step to a lower one takes place in a corresponding manner and needs not be described in detail. The spur wheel trains corresponding to the three speed steps can also be connected in series, whereby a fourth, very low speed step is obtained, the use of which is required e. g. for the starting of heavily loaded trains or on steep gradients. When e. g. the locomotive should start at the fourth speed step, the couplings $n^2$, $d^1$ and $k^1$ $i^2$ are thrown in and the other couplings thrown out, if required. Then half N of the main coupling is in connection with the driven shaft C through $N^1$, $n^2$, $d^1$ H, $h^1$, K, $k^1$, $i^2$, J, E, $f^1$, F, $c^1$. Now upon throwing in the main coupling $A^3$ $a^4$, N the drive of shaft C takes place over this train with the lowermost gear ratio and with series connection of the wheel trains $d^1$, H, J, E and F $c^1$. When, after the setting operation has been terminated the coupling halves $A^3$ $a^4$ and N have reached equal rates of revolution, coupling P, $d^4$ is thrown in and coupling $n^2$, $d^1$ and the main coupling $A^3$, $a^4$, N thrown out again, so that power transmission now takes place on the way A $A^3$, Q, P, $d^4$ $D^3$ $d^1$, H, $h^1$, K, $k^1$, $i^2$, J, E, $f^1$, F, $c^1$ C. Coupling half N then comes to rest, if not entrained by bearing friction.

As to be seen from the foregoing the two couplings P, $d^4$ and $b^5$, G adapted to be operated at will and alternately transmitting in the individual speed steps the power from the driving shaft to the corresponding wheel trains, are in permanent connection with the driving shaft A through the intermediary of the resiliently turning coupling members P and $b^4$, which affords the advantage, as explained above in detail, that the power transmission over the engaging faces of the couplings takes place uniformly and that a rapid wear causing shock effects is prevented.

I claim:

1. In a variable speed gear a driving member, a driven member, a slip clutch, one half of said slip clutch being permanently connected to said driving member, two alternative gear-wheel trains of different ratios of transmission comprising two gear wheels arranged coaxially with said slip clutch, a free wheel coupling for said gear-wheel trains, two couplings to be operated at will between said gear wheels and said clutch half for coupling said gear wheels and said clutch half when said clutch is inoperative, additional couplings to be operated at will between said gear wheels and the other half of said slip clutch, for coupling each of said gear wheels with said other half, when said slip clutch is inoperative.

2. In a variable speed gear as claimed in claim 1, resilient means interposed between the driving halves of said first-mentioned couplings and said first-mentioned clutch half, said means permitting a relative rotation between said coupling halves and said clutch half.

The foregoing specification signed at Essen, Germany this 11th day of March, 1929.

WERNER JACOBS.